(12) United States Patent
Nakanishi et al.

(10) Patent No.: US 7,998,903 B2
(45) Date of Patent: Aug. 16, 2011

(54) GLYCEROL-MODIFIED SILICONE SPREADING AGENT AND A COMPOSITION COMPRISING THE SAME

(75) Inventors: Tetsuo Nakanishi, Annaka (JP); Akira Yamamoto, Joetsu (JP); Teruki Ikeda, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1146 days.

(21) Appl. No.: 11/131,268

(22) Filed: May 18, 2005

(65) Prior Publication Data

US 2005/0261133 A1    Nov. 24, 2005

(30) Foreign Application Priority Data

May 19, 2004 (JP) ................. 2004-149633
May 19, 2004 (JP) ................. 2004-149639
Jun. 7, 2004  (JP) ................. 2004-168405

(51) Int. Cl.
  *A01N 25/00*  (2006.01)
  *A01N 25/30*  (2006.01)
(52) U.S. Cl. ................................. 504/358
(58) Field of Classification Search ............ 504/189, 504/358

See application file for complete search history.

(56) References Cited

U.S. PATENT DOCUMENTS

| | | | |
|---|---|---|---|
| 4,431,789 A | 2/1984 | Okazaki et al. | |
| 5,144,054 A | 9/1992 | Shioya et al. | |
| 5,262,155 A | 11/1993 | Vincent et al. | |
| 5,475,127 A | 12/1995 | Klein et al. | |
| 5,558,806 A * | 9/1996 | Policello et al. | 516/204 |
| 5,561,099 A | 10/1996 | Murphy et al. | |
| 5,821,195 A * | 10/1998 | Sandbrink et al. | 504/206 |
| 6,051,533 A * | 4/2000 | Kajikawa et al. | 504/206 |
| 6,300,283 B1 | 10/2001 | Sakuta | |
| 2006/0034875 A1 | 2/2006 | Nakanishi et al. | |

FOREIGN PATENT DOCUMENTS

| | | |
|---|---|---|
| EP | 0 475 130 A2 | 3/1992 |
| EP | 0 355 650 B1 | 11/1992 |
| EP | 0 586 048 A1 | 3/1994 |
| EP | 0 648 413 A1 | 4/1995 |
| EP | 1 314 356 A1 | 5/2003 |
| EP | 1 053 678 B1 | 9/2004 |
| EP | 1 496 080 A1 | 1/2005 |
| JP | 6-157236 A | 6/1994 |
| JP | 7-187903 | 7/1995 |
| JP | 09316085 A * | 12/1997 |
| JP | 2000-1404 | 1/2000 |
| WO | WO-01/87063 A2 | 11/2001 |
| WO | WO-2004/024798 A1 | 3/2004 |

OTHER PUBLICATIONS

Noda et al., JP 09316085 A, Reactive Siloxanes, Modification of Polymers and Polymer compositions, Dec. 1997, Translation from http://www.ipdl.inpit.go.jp/homepg_e.ipdl.*
Gaskin et al., "Enhancement of Plant- and petroleum-derived spray oils with alklsilicone surfactants," Spray Oils Beyond 2000: Sustainable Pest and Disease Management, Proceedings of a Conference held form Oct. 25 to 29, 1999 in Sydney, New South Wales, Australia, pp. 56-61 (Jun. 2002).
McCall et al., "Modeling the Foliar Behavior of Atrazine with and without Crop Oil Concentrate on Giant Foxtail and the Effect of Tridiphane on the Model Rate Constants," J. Agric. Food. Chem., vol. 34, pp. 235-238, (1986).
Pesticide Formulation Guide, Edited by the Special Committee on Agricultural Formulations and Applications, Pesticide Science Society of Japan, Plant Protection Association, Oct. 30, 1997, pp. 104-109, lines 1-5.
European Office Action, dated Mar. 31, 2011, for European Application No. 05076175.8.

* cited by examiner

*Primary Examiner* — Johann Richter
*Assistant Examiner* — Andriae M Holt
(74) *Attorney, Agent, or Firm* — Birch, Stewart, Kolasch & Birch, LLP (57) ABSTRACT

A spreading agent for agricultural chemicals, said spreading agent comprising at least one of the glycerol-modified silicone represented by the following formula (1), (2) or (3),

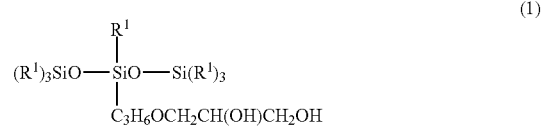

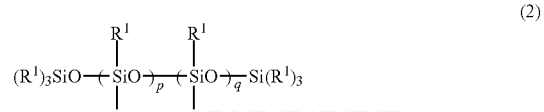

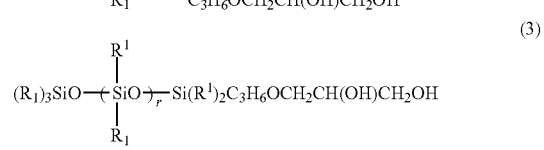

wherein $R^1$ can be the same with or different from each other and is selected from the group consisting of alkyl, aryl, aralkyl, and fluorinated alkyl groups each having 1 to 30 carbon atoms, p is an integer of from 1 to 3, q is an integer of 1 or 2, and r is an integer of from 0 to 6.

10 Claims, 2 Drawing Sheets

GLYCEROL-MODIFIED SILICONE SPREADING AGENT AND A COMPOSITION COMPRISING THE SAME

CROSS REFERENCES

This application claims the benefits of Japanese Patent application No. 2004-149633 filed on May 19, 2004, Japanese Patent application No. 2004-149639 filed on May 19, 2004, and Japanese Patent application No. 2004-168405 filed on Jun. 7, 2004, the contents of which are hereby incorporated by reference.

TECHNICAL FIELD

The present invention relates to a glycerol-modified silicone spreading agent and an agricultural chemical composition comprising the same. The present invention relates also to a novel glycerol-modified silicone and an agricultural chemical composition comprising the same. The glycerol-modified silicones significantly reduce surface tension of agricultural oil agents to allow them to spread widely and uniformly on leaves, to th aryl, aralkyl, and fluorinated alkyl groups each having 1 to 30 carbon atoms, p is an integer of from 1 to 3, q is an integer of 1 or 2, and r is an integer of from 0 to 6, (III) 1 to 50 parts by weight of a nonionic surfactant,

(IV) water in an amount of 0 to 1000 parts by weight per 100 parts by weight of a total weight of the components (I), (II) and (III).

Still another aspect of the present invention is a glycerol-modified silicone having a structure A-B-A, wherein the structural unit A is an organosiloxane residue represented by the following formula (6), (6)

and the structural unit B is a glycerol derivative residue represented by the following formula (7), (7)

wherein $R^2$ can be the same with or different from each other and is selected from the group consisting of alkyl, alicyclic, aryl, aralkyl and halogenated groups thereof, each having 1 to 10 carbon atoms, x is an integer of from 0 to 100, α is an integer of 1 or 2, $R^3$ can be the same with or different from each other and is an alkylene group having 2 to 11 carbon atoms, and s is an integer of from 1 to 11.

The spreading agent of the present invention significantly reduces surface tension of an oil agent or an agricultural chemical to allow them spread widely and uniformly on agricultural plants.

The novel silicone of the present invention is surface active and, when added to agricultural chemicals or paints, enhances spreading of the agricultural chemicals on plants or the paints on substrates.

PREFERRED EMBODIMENTS OF THE INVENTION

The present spreading agent comprises at least one of the glycerol-modified silicones represented by the following formula (1), (2) or (3).

(1)

(2)

(3)

In the above formulae, $R^1$ can be the same with or different from each other and is selected from the group consisting of alkyl, aryl, aralkyl, and fluorinated alkyl groups each having 1 to 30, preferably 1 to 6, carbon atoms. Examples of $R^3$ include alkyl groups such as methyl, ethyl, propyl, butyl, pentyl, hexyl, heptyl, octyl, nonyl, and decyl groups; alicyclic groups such as cyclopentyl and cyclohexyl groups; aryl groups such as phenyl and tolyl groups; aralkyl groups such as benzyl and phenetyl groups; and fluorinated alkyl groups such as trifluoropropyl an heptadecafluorodecyl groups. Preferably, $R^1$ is a methyl, ethyl, propyl, butyl or phenyl group and, more preferably, at least 80% of $R^1$ is a methyl group.

The glycerol-modified silicone may be prepared by subjecting an organohydrogentrisiloxane and a glycerol monoallyl ether, for example, 1-allyloxy-2,3-propanediol, to an addition reaction. A preferred example of the silicone represented by the formula (1) is the one represented by the following formula (4) which is an addition reaction product of 1,1,1,3,5,5,5-heptamethyltrisiloxane with 1-allyloxy-2,3-propanediol.

(4)

Examples of the starting organohydrogenpolysiloxane for preparing the silicone represented by the formula (2) include $M_2DD^H$, $M_2D_2D^H$, $M_2D_3D^H$, $M_2DD^H{}_2$, $M_2D_2D^H{}_2$, $M_2D_3D^H{}_2$ and a mixture thereof. A mixture of various cyclic or linear silicones obtained by an equilibrating reaction, hereinafter referred to as a mixture of equilibrium, may also be used. In this specification, M represents $(H_3C)_3SiO_{1/2}$, D represents $(H_3C)_2SiO$, $M^H$ represents $H(H_3C)_2SiO_{1/2}$, $D^H$ represents $H(H_3C)_2SiO$, $M^R$ represents $R(H_3C)_2SiO_{1/2}$, and $D^R$ represents $R(H_3C)_2SiO$. Preferably, $M_2DD^H$, $M_2D_2D^H$, or $M_2D_3D^H$, each having one hydrogen atom, and more preferably, $M_2DD^H$ or $M_2D_2D^H$ is used. The glycerol-modified silicone of the formula (2) can be obtained by the addition reaction of these organohydrogenpolysiloxane with a glycerol monoallyl ether, for example, 1-allyloxy-2,3-propanediol.

In the formula (3), r is an integer of from 0 to 6, preferably 0 to 3. Examples of a starting organohydrogenpolysiloxane include $MM^H$, $MDM^H$, $MD_3M^H$, and $M^{n-Bu}D_{4.5}M^H$. $MDM^H$ may be a mixture of equilibrium containing $M_2^H$, $MM^H$, MDM$^H$, M$_2^H$D, MD$_3$M$^H$, and M$_2^H$D$_2$ obtained by equilibrating 1 mole of M$_2$, 1 mole of M$_2^H$ and ¼ mole of D$_4$ in the presence of an acidic catalyst M$^{n\text{-}Bu}$D$_{4.5}$M$^H$ may be a mixture of M$^{n\text{-}Bu}$D$_3$M$^H$ and M$^{n\text{-}Bu}$D$_6$M$^H$. Preferably, MM$^H$ or MD$_3$M$^H$ is used and, more preferably, MD$_3$M$^H$ is used. A preferred example is an addition reaction product of MD$_3$ M$^H$ with 1-allyloxy-2,3-propanediol represented by the following formula (5).

(5)

The organohydrogenpolysiloxane and the glycerol monoallyl ether are subjected to an addition reaction in a molar ratio of unsaturated bonds, for example, allyl groups, to SiH bonds is in a range of from 0.8 to 1.5, preferably from 0.9 to 1.2.

The aforesaid addition reaction is preferably carried out in the presence of platinum catalyst or rhodium catalyst. Preferred examples of the catalyst include chloroplatinic acid, alcohol-modified chloroplatinic acid, a chloroplatinic acid complex with vinylsiloxane. Sodium acetate or sodium citrate may also be used as a promoter.

The catalyst may be used in a catalytically effective amount. Preferably, the amount is no more than 50 ppm, particularly no more than 20 ppm calculated as platinum or rhodium. The aforesaid addition reaction may be carried out in an organic solvent as necessary. Examples of such solvent include aliphatic alcohols such as methanol, ethanol, 2-propanol, and butanol; aromatic hydrocarbons such as toluene and xylene; aliphatic or alicyclic hydrocarbons such as n-pentane, n-hexane, and cyclohexane; and halogenated hydrocarbons such as dichloromethane, chloroform, and carbon tetrachloride. Reaction conditions are not particularly limited. Preferably, the reaction is performed in refluxing organic solvent for 1 to 10 hours.

The aforesaid glycerol-modified silicone is used as an adjuvant for agricultural chemicals such as oil agents or agricultural formulations in a desired concentration. Alternatively, the glycerol-modified silicone may be formulated into a composition comprising an oil agent to be applied. In such composition comprising the glycerol-modified silicone and the oil agent, the oil agent may be incorporated in an amount of from 0.1 to 100,000 parts by weight per 100 parts by weight of glycerol-modified silicone. If the amount exceeds the aforesaid upper limit, reduction of the surface tension by the glycerol-modified silicone may be unsatisfactory. As the oil agent, the same oil agent as the oil agent (I) described below can be used.

The composition may also contain surfactant to be mixed with water. Thus, the second aspect of the present invention is an agricultural chemical composition containing the following components (I) to (IV):
(I) 100 parts by weight of an oil agent,
(II) 0.1 to 100 parts by weight of at least one glycerol-modified silicone represented by the formula (1), (2) or (3) described above.
(III) 1 to 50 parts by weight of a nonionic surfactant,
(IV) water in an amount of 0 to 1000 parts by weight per total 100 parts by weight of the components (I), (II) and (III).

In the aforesaid composition, any known oil agent (I) can be used as far as it has an effect as an agricultural chemical such as pesticide or can enhance penetration of an agricultural chemicals into leaves. Examples of the oil agent (I) include plant oils extracted from plant seeds, animal oils such as beef tallow, and hydrogenated or esterified products thereof. Mineral oils such as machine oil and spindle oil, collectively called as hydrocarbon oils, may also be used.

Examples of the animal or plant oils and semisynthetic oils which can be used as the oil agent are as follows: avocado oil, linseed oil, almond oil, Ibota wax, perilla oil, olive oil, cacao butter, kapok wax, kaya oil, carnauba wax, liver oil, candelilla wax, beef tallow, neat's-foot oil, beef bone fat, hydrogenated beef tallow, neat's-foot oil, apricot kernel oil, spermaceti wax, hydrogenated oil, wheat germ oil, sesame oil, rice germ oil, rice bran oil, sugar cane wax, sasanqua oil, safflower oil, shear butter, Chinese tung oil, cinnamon oil, jojoba wax, shellac wax, turtle oil, soybean oil, tea seed oil, camellia oil, evening primrose oil, corn oil, lard, rapeseed oil, Japanese tung oil, rice bran oil, germ oil, horse fat, persic oil, palm oil, palm kernel oil, castor oil, castor oil fatty acid methyl ester, sunflower oil, grape oil, bayberry wax, jojoba oil, macadamia nut oil, beeswax, mink oil, cottonseed oil, cotton wax, Japanese wax, Japanese wax kernel oil, montan wax, coconut oil, hydrogenated coconut oil, tri-coconut oil fatty acid glyceride, mutton tallow, peanut oil, lanolin, liquid lanolin, hydrogenated lanolin, lanolin alcohol, hard lanolin, lanolin acetate, isopropyl lanolate, hexyl laurate, POE lanolin alcohol ether, POE lanolin alcohol acetate, polyethylene glycol lanolate, POE hydrogenated lanolin alcohol ether, and egg yolk oil.

Preferably, those which are liquid at room temperature with a low melting point are used, for example, avocado oil, almond oil, olive oil, sesame oil, rice bran oil, safflower oil, soybean oil, corn oil, rapeseed oil, persic oil, castor oil, sunflower oil, grape seed oil, cottonseed oil, among which safflower oil, soybean oil, corn oil, rapeseed oil, castor oil, sunflower oil, cottonseed oil are more preferred because of their lower prices.

Examples of the hydrocarbon oils include so-called machine oils and spindle oils produced from petroleum. Other examples are ozokerite, α-olefin oligomer, squalane, squalene, ceresin, paraffin, paraffin wax, liquid paraffin, mineral oil, polybutene, liquid isoparaffin, microcrystalline wax, and Vaseline among which those which are liquid at room temperature like the animal or plant oils are preferred such as α-olefin oligomer, squalane, ceresin, liquid paraffin, and liquid isoparaffin. Liquid paraffin is more preferred.

Fatty acids, higher alcohols, and ester oils may be used as the oil agent, among which those which are liquid at room temperature are preferably used. The oil agent may be used as a mixture of two or more of them.

The glycerol-modified silicone (II) is contained in an amount of from 0.1 to 100 parts by weight, preferably 1 to 50 parts by weight, more preferably 1 to 15 parts by weight relative to 100 parts by weight of the oil agent. Within the aforesaid range, the glycerol-modified silicone dissolves thoroughly in the oil agent without separation, resulting in a composition easy to handle, and sufficiently lowers the surface tension of the oil agent.

In the present composition, the nonionic surfactant (III) is to disperse the oil agent and the glycerol-modified silicone in water to form an emulsion. Examples of the nonionic surfactant include sorbitan fatty acid esters, glycerin fatty acid esters, polyglycerin fatty acid esters, propylene glycol fatty acid esters, polyethylene glycol fatty acid esters, Sucrose fatty acid esters, polyoxyethylene alkylethers, polyoxypropylene alkylethers, polyoxyethylene polyoxypropylene alkyl ether, polyoxyethylene alkylphenylether, polyoxyethylene fatty acid esters, polyoxyethylene sorbitan fatty acid esters, polyoxyethylene sorbitol fatty acid esters, polyoxyethylene glycerin fatty acid esters, polyoxyethylene propylene glycol fatty acid esters, polyoxyethylene castor oil, polyoxyethylene hydrogenated castor oil, polyoxyethylene phytostanolether, polyoxyethylene phytosterolether, polyoxyethylene cholestanolether, polyoxyethylene cholesterylether, a linear or branched polyoxyalkylene-modified organopolysiloxane, a linear or branched polyoxyalkylene/alkyl-comodified organopolysiloxane, alkanolamide, sugar ethers, sugar amides; and combinations of tow or more of these.

The nonionic surfactant (III) is contained in an amount of from 1 to 50, preferably from 2 to 40, more preferably 5 to 30 parts by weight, relative to a total weight of the spreading agent composition. If the amount of the surfactant is less than the aforesaid lower limit, the emulsifying effect is insufficient. The surfactant in an amount exceeding the aforesaid upper limit may prevent the glycerol-modified silicone from dissolving in the oil agent and from reducing the surface tension of the oil agent.

The present composition may be a self-emulsifying composition which does not contain water and, when added to water on site, is emulsified, or an emulsified composition containing water in a product form.

The emulsified composition may be prepared by adding an appropriate amount of water(IV) to a mixture of the aforesaid oil agent (I), the glycerol-modified silicone(II), and the nonionic surfactant (III) and mixing them into an emulsion with a mixer such as a propeller mixer, an anchor mixer, a paddle mixer, a homo mixer, a line mixer, a colloid mill or a homogenizer. The amount of water to be added is not more than 1000 parts by weight, preferably not more than 800 parts by weight, relative to total 100 parts by weight of the components (I), (II), and (III). If the amount exceeds the aforesaid upper limit, a concentration of the oil agent is so low that the resulting composition should be sprayed many times to attain a desired effect, which is not desirable from the economical point of view.

The present composition may further contain a small amount of preservative or disinfectant to prevent rotting. Examples of the preservative or disinfectant include sodium hypochlorite, sorbinic acid, potassium sorbinate, salicylic acid, sodium salicylate, benzoic acid, sodium benzoate, parabens, and isothiazoline compounds. The preservative or disinfectant may be added preferably in an amount of from 0.001 to 1.0 part by weight, more preferably from 0.005 to 0.008 part by weight, relative to 100 parts by weight or the spreading agent composition of the present invention.

In addition, the present composition may optionally contain a stabilizer such as polyvinyl alcohol, methyl cellulose, carboxymethyl cellulose, sodium salt of carboxymethyl cellulose, sodium polyacrylate, and xanthan gum.

Further, other agricultural chemicals and various additives may be incorporated. Examples of the agricultural chemicals include herbicides, disinfectants, and pesticides. To suppress foaming in a process of admixing the agricultural chemicals, a defoamer may be added such as a silicone defoamer comprising silicone oil and silica.

The present composition, either emulsified type or self-emulsifying type is further diluted with water and mixed to form a homogeneous emulsion and then sprayed on plants with a sprayer or a sprinkler. The mixing may be performed with a commonly used mixer such as a propeller mixer, an anchor mixer, a paddle mixer, a homo mixer, and a line mixer. For a small scale mixing, a stirring bar or spatula may be used. In the mixing, a defoamer may be used.

The third aspect of the present invention is a novel glycerol-modified silicone having a A-B-A structure, hereinafter referred to as A-B-A type glycerol-modified silicone, wherein A is an organosiloxane residue represented by the following formula (6).

(6)

In the above formula, $R^2$ can be the same with or different from each other and is selected from the group consisting of alkyl, alicyclic, aryl, aralkyl and halogenated groups thereof each having 1 to 10 carbon atoms. Examples of $R^2$ include alkyl groups such as methyl, ethyl, propyl, butyl, pentyl, hexyl, heptyl, octyl, nonyl, and decyl groups; alicyclic groups such as cyclopentyl and cyclohexyl groups; aryl groups such as phenyl and tolyl groups; aralkyl groups such as benzyl and phenetyl groups; and halogenated groups such as trifluoropropyl and nonafluoro groups among which methyl and butyl groups are preferred.

In the formula (6), x is an integer of from 0 to 100, preferably from 0 to 20, more preferably from 0 to 10, and α is an integer of 1 or 2. The organosiloxane residue may be derived from an α-organohydrogensiloxane having an SiH bond at a terminal thereof.

In the glycerol-modified silicone having A-B-A structure, B is a glycerol derivative residue expressed by the following formula (7).

(7)

In the above formula, $R^3$ can be the same with or different from each other and is an alkylene group having 2 to 11 carbon atoms such as ethylene, propylene, butylene, pentylene, or undecene group. Preferably, $R^3$ is an alkylene group having 2 to 5 carbon atoms, more preferably, 3 carbon atoms, i.e., a propylene group. s is an integer of from 1 to 11, preferably from 1 to 8, more preferably 2 to 4.

Any combination of x and s may be employed as far as each is within the aforesaid respective range. Preferably, if α is 1, x is 3 and s is 3 or 4 for use as an agricultural spreading agent, and, x ranges from 20 to 60 and s is 3 or 4 for use as a paint additive.

The glycerol derivative residue may be derived from a glycerol derivative having an unsaturated bond, particularly an allyl group at an end. The polyglycerol backbone of the glycerol derivative residue may be linear, formed by polymerization at terminal OH groups of glycerol or branched, formed by polymerization at least one secondary. OH group.

Preferably, B is a linear polyglycerol derivative residue represented by the following formula (8).

(8)

wherein $R^3$ is a propylene group and s ranges from 1 to 8.

The A-B-A type silicone of the present invention may be prepared by subjecting to an addition reaction an α-organohydrogensiloxane having an SiH bond at a terminal thereof and a glycerol or polyglycerol having two unsaturated aliphatic bonds in a molecule. Examples of the α-organohydrogensiloxane having an SiH bond at a terminal thereof include compounds having a structure of A-H, wherein A is the aforesaid organosiloxne residue and H is a hydrogen atom. For examples, $MD^HM$, $MM^H$, $MD_3M^H$, or $MD_9M^H$ as shown below may be used, wherein M, $M^H$, D and $D^H$ are as defied above.

-continued

Examples of the glycerol or polyglycerol having two unsaturated aliphatic bonds in a molecule include compounds which have the structure B, but a part, preferably a free end of $R^3$ is encapped with an unsaturated bond. For example, the triglycerol or tetraglycerol derivatives shown below are preferably used, wherein n is 2 or 3.

The glycerol derivative having two unsaturated aliphatic bonds may be prepared by reacting glycerol or polyglycerol such as diglycerol or triglycerol with an allyl glycidyl ether in the presence of an alkaline catalyst such as potassium hydroxide. The reaction is preferably carried out at a temperature of 60 to 120 degrees C. After the reaction completes, the aimed product can be isolated by neutralizing the alkaline catalyst followed by distilling volatile substances off.

The aforesaid α-organohydrogensiloxane and the glycerol derivative having an unsaturated bond are subjected to an addition reaction in a molar ratio of SiH bond to CH=CH$_2$ bond of from 0.5 to less than 1.5, preferably from 0.8 to less than 1.2.

The addition reaction conditions, for example, catalysts, solvents, temperature and time, are as described above.

After the addition reaction, the allyl ether bond may be decomposed by a weak acid or alkylated by hydrogenation. Tocopherol or BHT may be added to a reaction mixture as an antioxidant.

Figure 3:
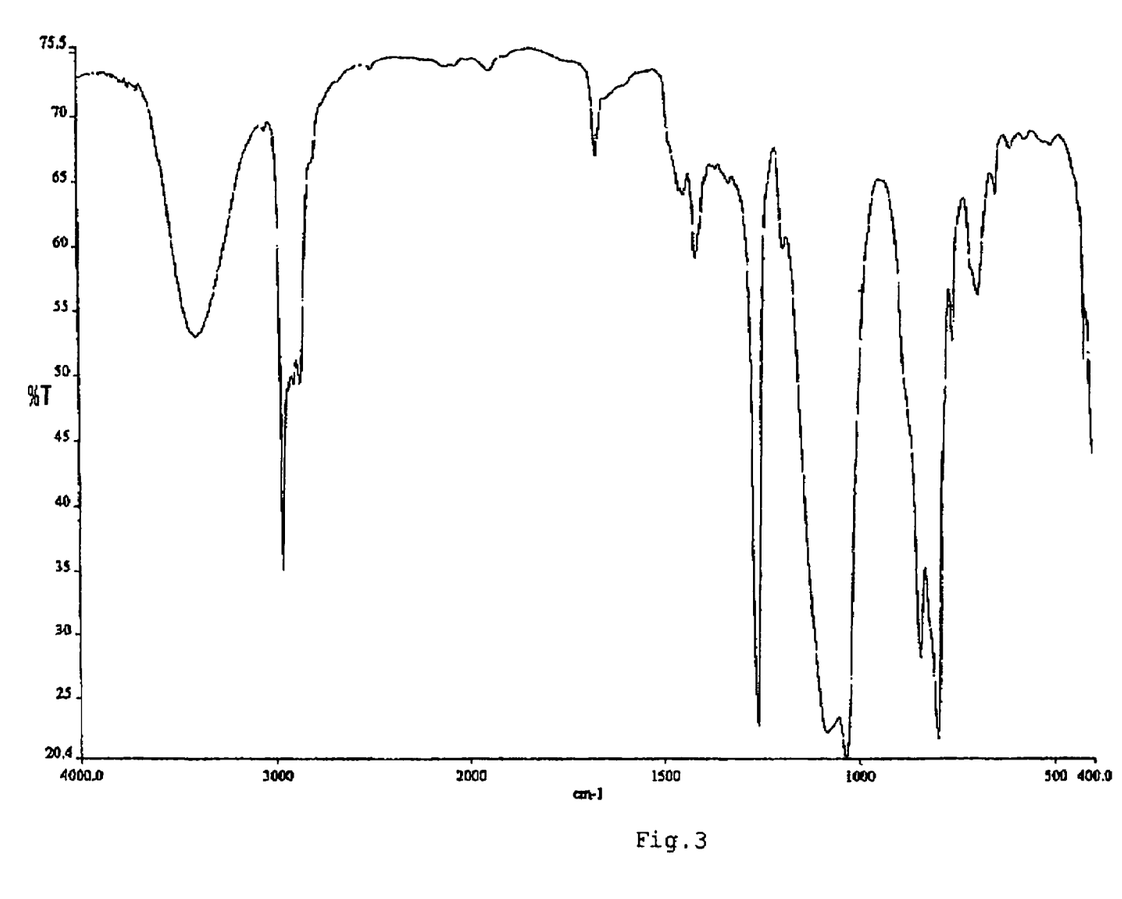
FIG. 3 is an IR spectrum of the silicone of Example 13.

FIG. 3 shows an exemplary Infrared spectrum of an A-B-A type glycerol-modified silicone obtained by the aforesaid method. The glycerol-modified silicone is surface active and well miscible with oil agents to reduce surface tension thereof. Therefore, the glycerol-modified silicone is suitable as an agricultural adjuvant such as a spreading agent and a wetting agent, a paint additive, or an additive for metalworking fluid.

As described above, the A-B-A type glycerol-modified silicone may be used as an adjuvant for agricultural chemicals such as oil agents or formulations. Alternatively, the A-B-A type glycerol-modified silicone may be formulated into a composition comprising an oil agent. In such composition, the oil agent may be incorporated in an amount of from 4 to 10,000 parts by weight per part by weight of glycerol-modified silicone. If the amount of the oil agent is lower than the aforesaid lower limit, the glycerol-modified silicone may not dissolve sufficiently. If the amount exceeds the aforesaid upper limit, reduction of the surface tension by the glycerol-modified silicone may be unsatisfactory.

Examples of the oil agent include those described above. The composition may contain the agricultural chemicals and various additives as described above. The composition may be a self-emulsifying composition which does not contain water and, when added to water on site, is emulsified, or an emulsified composition containing water in a product form. To make such an emulsified composition, one or more surfactants may be used to disperse the oil agent and the A-B-A type glycerol-modified silicone in water or aqueous formulation. Any surfactant, for example, anionic, cationic, nonionic or amphoteric surfactant, may be used. Preferably, a nonionic surfactant as described above is used because many agricultural chemicals are acidic.

The composition may further contain a preservative, a disinfectant, a stabilizer, an agricultural chemical and various additives as described above.

The composition of emulsified type or self-emulsifying type is further diluted with water and mixed to form a homogeneous emulsion and then sprayed on plants with a sprayer or a sprinkler. The mixing may be performed with a mixer described above.

EXAMPLES

The present invention will be explained in detail with reference to the following Examples, but not limited to them. In the Examples, surface tension was measured with a full automatic tensiometer, model PD-W, ex Kyowa Interface Science Co. Ltd., at 25 degrees C. according to the water drop method in which a contact angle with the air is measured. A surface tension of dimethylpolysiloxane having a viscosity of 30 mm$^2$/s at 25 degrees C. measured according to this method was 18.2 mN/m. In the tables shown below, "D" and "I" each represents a degree of solubility: "D" means "dispersed" and "I" means "insoluble." A silicone with no mark means that it dissolved to form a transparent solution.

I. Examples of Glycerol-Modified Silicone and Compositions

In Examples 1 to 5 and Comparative Examples 1 to 15, modified silicones were prepared in the following procedures. In a reactor provided with a stirrer, a thermometer, and a reflux condenser, placed were a compound having unsaturated bonds in such an amount that a molar ratio of the unsaturated bonds to SiH bonds of an organohydrogensiloxane to be added was 1.05, a solvent, and a catalytically effective amount of a catalyst. Into this reactor, the organohydrogensiloxane was added dropwise to cause a reaction. Then, the reaction mixture was distilled under a reduced pressure at 100 degrees C. to remove the solvent.

For example, the glycerol-modified silicone in Example 1 was prepared as follows. In a reactor provided with a stirrer, a thermometer, and a reflux condenser, 100 g of glycerol monoallyl ether, 100 g of isopropyl alcohol, and 0.05 g of a 0.5 wt % chloroplatinic acid solution in isopropyl alcohol were placed. In the reactor, 107 g of pentamethyldisiloxane was added drop wise at 60 degrees C while stirring to cause a reaction. Then, the reaction mixture liquid was distilled under a reduced pressure at 100 degrees C. to remove the solvent.

Examples 1 to 5

Some properties and solubility in oil agents were determined with each of the glycerol-modified silicone prepared in Examples 1 to 5. Surface tension of the mixtures of the silicone and the oil agent were measured, too.

TABLE 1

| Example No. | Starting organo hydrogen polysiloxane | Modifier ratio % | Viscosity 25 C. (mm²/s) | Specific gravity 25 C. | Refractive Index 25 C. | Surface Tension (mN/m, 25 C.) glycerol-modified silicone/oil agent = 10/90 | | |
|---|---|---|---|---|---|---|---|---|
| | | | | | | Liquid paraffin 27.9 | Rapeseed oil 31 | Soybean oil 31.8 |
| 1 | $MM^H$ | 47 | 71 | 0.973 | 1.4405 | 21.3 | 22.6 | 21.9 |
| 2 | $M_2D^H$ | 37 | 102 | 0.972 | 1.4318 | 21.5 | 21.2 | 20.8 |
| 3 | $M_2D_{2.5}D^H$ | 24 | 202 | 1 | 1.4274 | 20.0(D) | 21.0(D) | 21.1(D) |
| 4 | $MD_3M^H$ | 26 | 58 | 0.972 | 1.4242 | 21.4 | 19.9 | 19.9 |
| 5 | $M^{Bu}D_{4.5}M^H$ | 20 | 65 | 0.973 | 1.4228 | 23.1 | 20.0(D) | 21.1(D) |

In Table 1, "Modifier ratio %" means weight % of the glycerol monoallyl ether to a total weight of the glycerol monoallyl ether and the organohydrogensiloxane. The numerical values described just below the names of the oil agent are surface tension of the neat oil agents.

As seen from Table 1, the glycerol-modified silicones in the present invention significantly reduced the surface tension of the oil agents. Particularly, those in Examples 2 and 4 largely reduced the surface tension as well as showed excellent solubility in the oil agents. Although the glycerol-modified silicone showed lower solubility with the increasing molecular weight as seen in Examples 3 and 5, its surface activity was not adversely affected.

Change in surface tension with addition of the silicones of Example 2 and 4, respectively, was studied. As shown in the Table below, 1 wt % of addition significantly reduced a surface tension of the liquid paraffin, and 5 wt % of addition significantly reduced that of the plant oils, i.e., rapeseed oil and soybean oil.

TABLE 2

| Amount added, wt % | Surface tension, mN/m, 25 C. | | | | | | | | |
|---|---|---|---|---|---|---|---|---|---|
| | Liquid paraffin | | | Rapeseed oil | | | Soybean oil | | |
| | 1 | 5 | 10 | 1 | 5 | 10 | 1 | 5 | 10 |
| Example 2 | 23.4 | 21.3 | 21.5 | 31 | 22.6 | 21.2 | 27.8 | 22.6 | 20.8 |
| Example 4 | 21.9 | 21.4 | 21.4 | 28.6 | 20.7 | 19.9 | 28.7 | 22 | 19.9 |

Comparative Examples 1 to 3

Glycerol-modified silicones were prepared by modifying organohydrogenpolysiloxane with more amount of glycerol than specified in the present invention.

TABLE 3

| Comparative Example No. | Starting organo hydrogen polysiloxane | Modifier Ratio % | Viscosity 25 C. (mm²/s) | Specific gravity 25 C. | Refractive Index 25 C. | Miscibility glycerol-modified silicone/oil agent = 10/90 | | |
|---|---|---|---|---|---|---|---|---|
| | | | | | | Liquid paraffin | Rapeseed oil | Soybean oil |
| 1 | $M^HM^H$ | 66 | 161 | 1.038 | 1.4532 | (I) | (I) | (I) |
| 2 | $M_2D^H_2$ | 48 | 431 | 1.026 | 1.4425 | (I) | (I) | (I) |
| 3 | $M_2DD^H_3$ | 49 | 2536 | 1.074 | 1.4534 | (I) | (I) | (I) |

All of these modified silicones had higher viscosities. They had poor solubility in the oil agents. They settled out while the mixtures were allowed to stand until foams formed by mixing disappeared, so that surface tension of the mixtures could not be determined.

Comparative Examples 4 to 15

Silicones modified with compounds other than glycerol were prepared. Mixtures with the oil agents were prepared and surface tension thereof was measured as in Examples.

TABLE 4

| Comparative Example No. | Starting organo hydrogen polysiloxane | Modifier | Modifier ratio % | Viscosity, mm²/s 25 C. | Specific gravity 25 C. | Refractive Index 25 C. | Surface Tension (mN/m, 25 C.) glycerol-modified silicone/oil agent = 10/90 | | |
|---|---|---|---|---|---|---|---|---|---|
| | | | | | | | Liquid paraffin | Rapeseed oil | Soybean oil |
| 4 | $M^HM^H$ | $n\text{-}C_8H_{16}$ | 50 | 5 | 0.821 | 1.433 | 27.1 | — | — |
| 5 | $M_2D^H$ | $n\text{-}C_6H_{12}$ | 30 | 2 | 0.832 | 1.4063 | 25 | — | — |
| 6 | $M_2D^H$ | $n\text{-}C_8H_{16}$ | 34 | 3 | 0.835 | 1.4132 | 25.5 | 24.5 | 24.9 |

TABLE 4-continued

| Comparative Example No. | Starting organo hydrogen polysiloxane | Modifier | Modifier ratio % | Viscosity, mm²/s 25 C. | Specific gravity 25 C. | Refractive Index 25 C. | Surface Tension (mN/m, 25 C.) glycerol-modified silicone/oil agent = 10/90 | | |
|---|---|---|---|---|---|---|---|---|---|
| | | | | | | | Liquid paraffin | Rapeseed oil | Soybean oil |
| 7 | $M_2D^H$ | n-$C_{12}H_{24}$ | 43 | 6 | 0.84 | 1.4225 | 26.3 | — | — |
| 8 | $MDM^H$ | n-$C_8H_{16}$ | 34 | 3 | 0.837 | 1.4131 | 25 | — | — |
| 9 | $MM^H$ | 4-Penten-1-ol | 37 | 12 | 0.871 | 1.4245 | 25.5 | 27.5 | 27.4 |
| 10 | $M_2D^H$ | 4-Penten-1-ol | 28 | 15 | 0.892 | 1.419 | 25.4 | — | — |
| 11 | $M_2D^H$ | Isoprenol*¹ | 28 | 14 | 0.895 | 1.4193 | 23.7 | 24.9 | 24.3 |
| 12 | $M_2D^H$ | EG*² | 32 | 9 | 0.923 | 1.42 | 23 | 24.7 | 25.7 |
| 13 | $M_2D^H$ | TG*³ | 57 | 6960 | 1.063 | 1.4525 | (I) | (I) | (I) |
| 14 | $MM^H$ | TP*⁴ | 54 | 132 | 0.958 | 1.4462 | 23 | 26.9 | 27.5 |
| 15 | $M_2D^H$ | TP*⁴ | 44 | 155 | 0.962 | 1.4392 | 22.1 | 25.3 | 26 |

*¹isoprenol, i.e., 3-methyl-3-butene-1-ol, monoalcohol.
*²ethylene glycol monoallyl ether: $H_2C$=$CHCH_2OCH_2CH_2OH$, monoalcohol
*³triglycerol monoallyl ether: $H_2C$=$CHCH_2O\{CH_2CH(OH)CH_2O\}_3H$, tetraalcohol
*⁴trimethyrolpropane monoallyl ether: $H_2C$=$CHCH_2OCH_2C(C_2H_5)$ $(CH_2OH)_2$, dialcohol Comparing the results shown in Table 1 with those in Table 4, the silicones in Comparative Examples were less surface active than the silicones in Examples 1-5. The silicones modified with isoprenol, ethylene glycol monoallyl ether and trimethyrolpropane monoallyl ether, respectively, reduced surface tension to an extent, but not as effective as the silicones in Examples, especially for the plant oils. Although trimethyrolpropane monoallyl ether is similar to glycerol monoallyl ether in difunctionality and molecular weight, the silicones modified with it in Comparative Examples 14 and 15 were inferior the silicones of Examples 1-5 in reduction of surface tension.

Table 5 shows changes in surface tension with amount of the silicones of some of the Comparative Examples. Over 15 wt % of the silicones were required to attain the surface tension that was attained by only 1 wt % of the silicone in Example 2, of which surface tension data copied from Table 2 are shown for reference. This indicates superior performance of the silicones in the present invention.

TABLE 5

| Amount added, wt % | Comparative Example No. Surface tension, mN/m | | | |
|---|---|---|---|---|
| | 1 | 5 | 10 | 15 |
| 6 | 27.4 | 25.3 | 25.5 | 24.4 |
| 10 | 26.6 | 25 | 25.4 | 22.7 |
| 11 | 27 | 24.4 | 23.7 | 23.7 |
| 12 | 25.8 | 24.6 | 23 | 23.7 |
| Example 2 | 23.4 | 21.3 | 21.5 | 21 |

Examples 6 to 10

Using the silicones in Examples 1 and 2, respectively, the compositions shown in the following Table were prepared.

TABLE 6

| | | Formulation, parts by weight | | | | |
|---|---|---|---|---|---|---|
| Component | | Example 6 | Example 7 | Example 8 | Example 9 | Example 10 |
| Oil agent | Soybean oil | 85.0 | | 80.0 | | 36.0 |
| | Rapeseed oil | | 82.0 | | 38.0 | |
| Glycerol-modified silicone | Example 1 | | 8.0 | | | 4.0 |
| | Example 2 | 5.0 | | 5.0 | 2.0 | |
| Emulsifier | Polysolvate 80 | | 5.0 | | | 2.0 |
| | Polysolvate 85 | 10.0 | 5.0 | 10.0 | | 2.0 |
| | polyoxyethylene decyl ether (EO 4 moles) | | | 5.0 | 1.0 | |
| | polyoxyethylene decyl ether (EO 14 moles) | | | | 3.0 | |
| Water | | | | | 55.7 | 55.7 |
| Stabilizer | Carboxymethyl cellulose Sodium salt | | | | 0.3 | 0.3 |
| | Spreading property | A | A | A | A | A | polysolvate 80: polyoxyethylene sorbitane monooleate
polysolvate 85: polyoxyethylene sorbitane trioleate In the Table 6, spreading property was determined according to the following method. To each composition, water was added so as to make a total weight of the components other than water to be 10 wt % relative to a total weight. The mixture thus obtained was made homogeneous by stirring and then sprayed on leaves of Citrus Natsudaidai. After the water evaporated, surface of the leaves were visually observed to determine how wide the oil agent contained in the composition spread. Based on the observation, the compositions were rated according to the following criteria.
- A: The oil agent covered more than 95% of a total surface area of leaves.
- B: The oil agent covered over 70% to 95% of a total surface area of leaves.
- C: The oil agent covered 70% or less of a total surface area of leaves.

Comparative Examples 16-19 and Referential Example 1

Using the silicones in Comparative Examples 3 and 9, respectively, the compositions shown in the Table below were prepared. In addition, a referential composition was prepared which contained the silicone in Example 2 in an amount outside the range specified in the present invention.

II. Examples of A-B-A Type Glycerol-Modified Silicone and Compositions

Preparation of a Glycerol Derivative Having Two Unsaturated Bonds in a Molecule

A glycerol derivative having two unsaturated bonds in a molecule, hereinafter referred to as a diallylated glycerol, was prepared according to the method described above. That is, a polyglycerol and allylglycidyl ether were subjected to a reaction in the presence of potassium hydroxide catalyst at a temperature of from 60 to 120 degrees C. Then, after neutralizing the catalyst, volatile substances were distilled off.

Triglycerol diallyl ether thus obtained was light yellow liquid having a viscosity of 330 mm$^2$/s, hydroxyl number of 523 KOH mg/g, and a degree of unsaturation of 6.13 meg/g. The hydroxyl number and the degree of unsaturation almost agreed with respective theoretical values of 525 and 6.24.

By the same method, prepared was tetraglycerol diallyl ether which was light yellow liquid having a viscosity of 1397 mm$^2$/s, hydroxyl number of 533 KOH mg/g, and a degree of unsaturation of 5.05 meq/g.

Using the diallylated glycerol obtained, A-B-A type of glycerol-modified silicones of Examples 11 to 21 were prepared according to the following method. In a reactor equipped with a stirrer, a thermometer, and a reflux condenser, placed were the polyglycerol diallylether in such an

TABLE 7

| | | Formulation, parts by weight | | | | |
|---|---|---|---|---|---|---|
| Component | | Comparative Example 16 | Comparative Example 17 | Comparative Example 18 | Comparative Example 19 | Referential Example 1 |
| Oil | Soybean oil | 85.0 | | 94.5 | | 89.95 |
| | Rapeseed oil | | 82.0 | | 38.0 | |
| Glycerol-modified silicone | Example 2 | | | | | 0.05 |
| | Comparative Example 3 | | 8.0 | | | |
| | Comparative Example 9 | 5.0 | | 5.0 | 2.0 | |
| Surfactant | Polysolvate 80 | | 5.0 | | | |
| | Polysolvate 85 | 10.0 | 5.0 | 0.5 | | 10 |
| | polyoxyethylene decyl ether (EO 4 moles) | | | | 1.0 | |
| | polyoxyethylene decyl ether (EO 14 moles) | | | | 3.0 | |
| Water | | | | | 55.7 | 55.7 |
| | Carboxymethyl celullose Sodium salt | | | | 0.3 | 0.3 |
| Spreading property | | B | B | — | B | B |

In the Table 7, spreading property of the composition in Comparative Example 18 could not be determined because a homogenous mixture with water could not be prepared.

As can be seen from the Table 7, the compositions of Comparative Examples 16-19 have poorer spreading property than the compositions of Examples 6-10.

Figure 1:
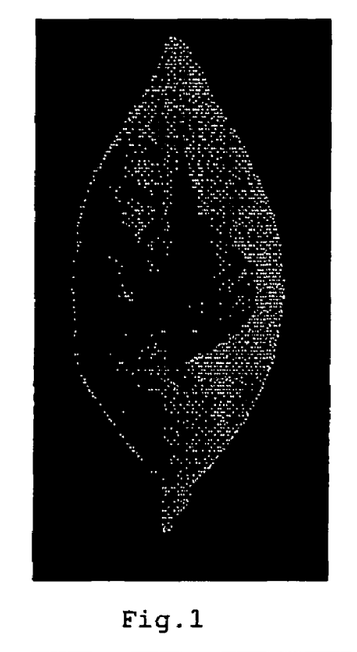
FIG. 1 is a photograph showing a drop of the composition containing the silicone of Example 2 placed on a leaf of Citrus Natsudaidai.
Figure 2:
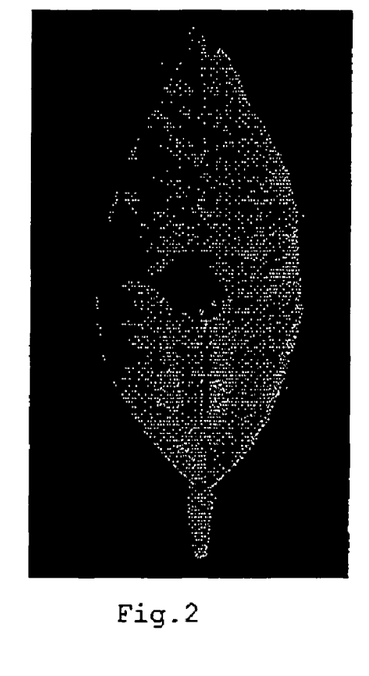
FIG. 2 is a photograph showing a drop of the composition containing the silicone of Comparative Example 6 placed on a leaf of Citrus Natsudaidai.

FIGS. 1 & 2 are photographs each taken 5 minutes after one drop, i.e., 15 µl, of liquid paraffin containing 10 wt % of the silicone of Example 2 and Comparative Example 6, respectively, was placed on a leaf of Citrus Natsudaidai. While the drop remained as a small circle in FIG. 2, the drop spread widely on the leave in FIG. 1. Comparing the figures, the liquid paraffin containing the glycerol-modified silicone in Example 2 has better spreading property than the silicone modified with n-octene.

amount that a molar ratio of unsaturated bonds thereof to SiH bonds of an organohydrogensiloxane to be added was 1.0, solvent and catalytically effective amount of a catalyst. Then, the organohydrogensiloxane was added dropwise in the reactor to cause reaction with the polyglycerol diallylether. Subsequently, the reaction mixture was distilled at 100 degrees C. under a reduced pressure to remove the solvent. For example, the glycerol-modified silicone of Example 13 was prepared as follows. In the reactor, 100 g of triglycerol diallyl ether, 300 g of isopropanol, and 0.05 g of 0.5 wt % solution of chloroplatinic acid in isopropanol were placed. Then, the reaction was carried out by adding 210 g of MD$_3$M$^H$ dropwise to the reactor. After the reaction, the solvent was removed by distillation at 100 degrees C. under a reduced pressure. Similarly, other A-B-A type glycerol-modified silicones having different polymerization degrees of siloxane and glycerol were prepared.

The A-B-A type silicone in Example 13 obtained was dissolved in deuterated chloroform and analyzed by $^{29}$Si—NMR. It was confirmed that the silicone had a $MD_3M^R$ moiety based on two peaks each associated with $Me_3SiO$—, and, —$CH_2Me_2SiO$—, respectively, observed at chemical shifts of 7.52 ppm and 7.11 ppm with a peak area ratio of 1:1, and two peaks at −21.4 ppm and −21.6 ppm with a peak area ratio of 2:1 associated with —$OMe_2SiO$—.

It was also confirmed with $^1$H-NMR that one mole of $MD_3M^H$ was bonded to one mole of an allyl group based on observation that a ratio of an integrated intensity of the signal at 0.5 ppm associated with —$CH_2Me_2SiO$— to that of the signal at 0.1 ppm associated with $Me_3SiO$— and -$Me_2SiO$— was 2:33.

Further, it was confirmed that 2 moles of the siloxane were bonded to one mole of the glycerol moiety based on the observation that a ratio of an integrated intensity of the signals ranging from 3.3 to 3.9 ppm associated with the hydrogen atoms of the glycerol to that of the signal at 0.5 ppm associated with —$CH_2Me_2SiO$— was 11:2.

Infrared spectrum was also obtained in a KBr pellet. Around 3400 cm$^{-1}$, a strong absorption associated with OH stretching vibration was observed, confirming the presence of a glycerol moiety in the compound. FIG. 3 shows an IR spectrum of the silicone in Example 13.

Examples 11 to 21

Eleven species of A-B-A type glycerol-modified silicones were prepared and subjected to measurements of several properties as shown in the Table 8.

TABLE 8

| Example No. | Staring organohydrogen siloxane | Starting diallylated grlycerol | Glycerol wt % | Viscosity 25 C. (mm$^2$/s) | Specific Gravity 25 C. | Refractive index 25 C. |
|---|---|---|---|---|---|---|
| 11 | $MM^H$ | Triglycerol | 52 | 487 | 1.004 | 1.4513 |
| 12 | $MD^HM$ | " | 42 | 310 | 0.996 | 1.4378 |
| 13 | $MD_3M^H$ | " | 33 | 160 | 0.985 | 1.4193 |
| 14 | $MD_9M^H$ | " | 17 | 142 | 0.9772 | 1.4195 |
| 15 | $M^{n-Bu}D_{18}M^H$ | " | 10 | 83 | 0.9732 | 1.412 |
| 16 | $M^{n-Bu}D_{40}M^H$ | " | 5 | 211 | 0.975 | 1.4098 |
| 17 | $M^{n-Bu}D_{60}M^H$ | " | 3 | 279 | 0.975 | 1.4072 |
| 18 | $MM^H$ | Tetraglycerol | 57 | 1710 | 1.031 | 1.4564 |
| 19 | $MD_3M^H$ | " | 38 | 829 | 1.009 | 1.4362 |
| 20 | $MD_9M^H$ | " | 20 | 456 | 0.9865 | 1.4223 |
| 21 | $M^{n-Bu}D_{18}M^H$ | " | 12 | 149 | 0.978 | 1.4131 |

In the Table above, "Glycerol" in wt % means weight percentage of the diallylated glycerol in the starting reaction mixture. The viscosity was measured with a Cannon-Fenske viscometer, the specific gravity was measured by hydrometer method, and the refractive index was measured with an Abbe refractometer.

Examples 22 to 26

Compositions were prepared containing an oil agent and the glycerol-modified silicone in a weight ratio of 90/10 and surface tension thereof was measured. The results areas seen in Table below.

TABLE 9

| | | Surface tension, mN/m, 25 C. glycerol-modified silicone/oil agent = 10/90 | | |
|---|---|---|---|---|
| | A-B-A type | | | |
| Example No. | glycerol-modified silicone | Liquid paraffin 27.9 | Rapeseed oil 31 | Soybean oil 31.8 |
| 22 | 11 | 22.5 | 22.3 | 21.1 |
| 23 | 12 | 21.5 | 21 | 21 |
| 24 | 13 | 20 | 20.3(D) | 19.6(D) |
| 25 | 18 | 21.8 | 21.5(D) | 21.5(D) |
| 26 | 19 | 20.8(D) | 18.7(D) | 19.0(D) |

In the Table above, the numerical values described just below the name of the oil agent are surface tension of the neat oil agents, Comparing with the surface tension of neat oil agents, surface tensions of the compositions of Examples were significantly lower. Particularly, the surface tension of the compositions in Examples 24 and 26 were so low as that of commonly used silicone oils. The compositions where the A-B-A type silicone was not dissolved completely but dispersed, as designated "D", showed no problem in determining surface tension with a good reproducibility.

Change in surface tension with a concentration of the A-B-A type silicones of Examples 13 and 19, respectively, was studied. The results are as shown below.

TABLE 10

| Modified Silicone | Liquid paraffin Content, wt % | | | Rapeseed oil Content, wt % | | |
|---|---|---|---|---|---|---|
| | 1 | 5 | 10 | 1 | 5 | 10 |
| Example 13 | 21 | 21.5 | 20 | 25.6 | 19.4 | 20.3(D) |
| Example 19 | 19 | 19.4 | 20.8(D) | 20.3 | 20.5(D) | 18.7(D) |

One wt % of the silicone reduced the surface tension of the liquid paraffin significantly, and 5 wt % of the silicone reduced the surface tension of the rapeseed oil. The modified silicone in Example 19 was so effective that only 1 wt % thereof reduced the surface tension of the both oil agents.

Comparative Examples 20 to 25

Silicones without having a glycerol residue and silicones having a structure other than, A-B-A, were prepared and subjected to the measurements as in Examples. Mixtures with the oil agents were prepared each of which surface tension was measured as in Examples. The results are as shown in the Table below.

TABLE 11

| Comparative Example No. | Starting organohydrogen siloxane | Modifier | Viscosity, mm²/s 25 C. | Specific gravity 25 C. | Refractive Index 25 C. | Surface Tension, mN/m, 25 C. glycerol-modified silicone/oil agent = 10/90 | | |
|---|---|---|---|---|---|---|---|---|
| | | | | | | Liquid paraffin | Rapeseed oil | Soybean oil |
| 20 | $M_2D^H$ | $C_8H_{16}$ | 3 | 0.835 | 1.4132 | 25.5 | 24.5 | 24.9 |
| 21 | $MM^H$ | 4-Penten-1-ol | 12 | 0.871 | 1.4245 | 25.5 | 27.5 | 27.4 |
| 22 | $M_2D^H$ | Isoprenol* | 14 | 0.895 | 1.4193 | 23.7 | 24.9 | 24.3 |
| 23 | $M_2D^H$ | EG*² | 9 | 0.923 | 1.42 | 23 | 24.7 | 25.7 |
| 24 | $M_2D^H$ | TG*³ | 6960 | 1.063 | 1.4525 | (I) | (I) | (I) |
| 25 | $MM^H$ | TP*⁴ | 132 | 0.958 | 1.4462 | 23 | 26.9 | 27.5 |

*¹isoprenol, i.e., 3-methyl-3-butene-1-ol, monoalcohol
*²ethylene glycol monoallyl ether: $H_2C=CHCH_2OCH_2CH_2OH$, monoalcohol
*³triglycerol monoallyl ether: $H_2C=CHCH_2O(CH_2CH(OH)CH_2O)_3H$, tetraalcohol
*⁴trimethyrolpropane monoallyl ether: $H_2C=CHCH_2OCH_2C(C_2H_5)(CH_2OH)_2$, dialcohol As shown in Table 11, all of the silicones were less effective in reduction of surface tension than the present A-B-A type glycerol-modified silicone. Especially, the silicone in Comparative Example 24 modified with triglycerolmonoallyl ether having a structure of A-B had a poor miscibility with the oil agents to precipitate, so that surface tension of the mixtures with the oil agents could not be measured.

Examples 27 to 30

Emulsified Composition

The compositions having formulations shown in Table 12 were prepared. To each composition, water was added so as to make a total weight of the components other than water to be 10 wt % and a homogeneous emulsion was obtained by stirring. The emulsion thus obtained was sprayed on leaves of Citrus Natsudaidai. After sprayed water evaporated, surface of the leaves were visually observed to determine how wide the oil agent contained in the composition spread. Based on the observation, the spreading property of compositions was rated according to the following criteria.

A: The oil agent covered more than 95% of a total surface area of leaves.
B: The oil agent covered over 70% to 95% of a total surface area of leaves.
C: The oil agent covered 70% or less of a total surface area of leaves.

TABLE 12

| | Component | Example 27 | Example 28 | Example 29 | Example 30 |
|---|---|---|---|---|---|
| Oil agent | Rapeseed oil | 80.8 | 80.8 | 80.8 | 38 |
| Glycerol-modified silicone | Example 12 | 4.2 | | | |
| | Example 14 | | 4.2 | | 2 |
| | Example 16 | | | 4.2 | |
| Emulsifier | Reodole TW-0320 | 10 | 10 | 10 | 3 |
| | Noigen XL-80 | 5 | 5 | 5 | 1 |
| Water | | | | | 55.7 |
| Stabilizer | carboxymethyl celullose Sodium salt | | | | 0.3 |
| | Sreading property | A | A | A | A |

Reodole TW-0320: polyoxyethylene sorbitane trioleate, ex Kao Co. Noigen XL-80: polyoxyethylene propyldecylether, ex Daiichi Pharmaceutical Co., Ltd.

As can be seen from the Table above, the oil agent contained in the present emulsified compositions spread well on the leaves, indicating high efficacies thereof as spray agents.

The invention claimed is:

1. An agricultural chemical composition comprising
an agricultural chemical,
100 parts by weight of the spreading agent represented by the following formula (1):

(1)

wherein each $R^1$ can be the same as or different from each other and is selected from the group consisting of alkyl groups each having 1 to 30 carbon atoms, and
667 to 10,000 parts by weight of at least one oil agent.

2. The agricultural chemical composition according to claim 1, wherein the oil agent is at least one member selected from the group consisting of paraffin oils, Rapeseed oil, and soybean oil.

3. An agricultural chemical composition comprising the following components (I) to (IV):
- (I) 100 parts by weight of an oil agent,
- (II) 0.1 to 100 parts by weight of the glycerol-modified silicone represented by the following formula (1)

(1)

wherein each $R^1$ can be the same as or different from each other and is selected from the group consisting of alkyl groups each having 1 to 30 carbon atoms,
- (III) 1 to 50 parts by weight of a nonionic surfactant, and
- (IV) water in an amount of 0 to 1000 parts by weight per total 100 parts by weight of the components (I), (II) and (III).

4. The agricultural chemical composition according to claim 3, wherein the nonionic surfactant (III) is polyoxyethylene alkylether or polyoxyethylene sorbitane fatty acid ester.

5. The agricultural chemical composition according to claim 3, wherein the oil agent (I) is at least one member selected from the group consisting of paraffin oils, Rapeseed oil, and soybean oil.

6. The agricultural chemical composition according to any one of claims 3 to 5, wherein the glycerol-modified silicone (II) is represented by the following formula (4)

(4)

7. The agricultural chemical composition according to claim 3, wherein the composition further comprises an agricultural chemical.

8. The agricultural chemical composition according to claim 1 or claim 7, which comprise a herbicidally effective amount of at least one agricultural chemical which is a herbicide.

9. The agricultural chemical composition according to claim 1 or claim 7, which comprise a germicidally effective amount of at least one agricultural chemical which is a disinfectant.

10. The agricultural chemical composition according to claim 1 or claim 7, which comprise a pesticidally effective amount of at least one agricultural chemical which is a pesticide.

* * * * *